(12) United States Patent
Babovka et al.

(10) Patent No.: US 10,202,198 B2
(45) Date of Patent: Feb. 12, 2019

(54) LIFE-SAVING EQUIPMENT FOR UNMANNED AIR VEHICLES

(71) Applicants: Vysoke Uceni Technicke V Brne, Brno (CZ); Ing. Milan BABOVKA—Galaxy, Liberec (CZ)

(72) Inventors: Milan Babovka, Liberec (CZ); Robert Popela, Radkov (CZ); Jan Pejchar, Zdar nad Sazavou (CZ); Milos Daniel, Jahodniky (SK); Ondrej Nemcak, Vsetin (CZ)

(73) Assignees: VYSOKE UCENI TECHNICKE V BRNE, Brno (CZ); ING. MILAN BABOVKA—GALAXY, Liberec (CZ)

( * ) Notice: Subject to any disclaimer, the term of this patent is extended or adjusted under 35 U.S.C. 154(b) by 471 days.

(21) Appl. No.: 15/009,860

(22) Filed: Jan. 29, 2016

(65) Prior Publication Data

US 2016/0221681 A1 Aug. 4, 2016

(30) Foreign Application Priority Data

Jan. 30, 2015 (CZ) .................................. 2015-57
Feb. 19, 2015 (CZ) .............................. 2015-30766

(51) Int. Cl.
*B64D 17/72* (2006.01)
*B64C 39/02* (2006.01)
*B64D 17/42* (2006.01)
*B64D 17/80* (2006.01)

(52) U.S. Cl.
CPC .......... *B64D 17/725* (2013.01); *B64C 39/024* (2013.01); *B64D 17/42* (2013.01); *B64D 17/80* (2013.01); *B64C 2201/185* (2013.01)

(58) Field of Classification Search
CPC .............. B64C 2201/185; B64D 17/42; B64D 17/725; B64D 17/80
See application file for complete search history.

(56) References Cited

U.S. PATENT DOCUMENTS

| | | | |
|---|---|---|---|
| 1,019,858 | A | 1/1911 | Tanner |
| 1,785,770 | A | 12/1928 | Faber et al. |
| 2,673,051 | A | 5/1951 | Frost |
| 2,737,359 | A | 6/1954 | Brown |

(Continued)

FOREIGN PATENT DOCUMENTS

| | | |
|---|---|---|
| CN | 203958622 U | 11/2014 |
| GB | 2 133 365 A | 12/1983 |

(Continued)

*Primary Examiner* — Philip J Bonzell
*Assistant Examiner* — Michael B. Kreiner
(74) *Attorney, Agent, or Firm* — Jacobson Holman, PLLC.

(57) ABSTRACT

The life-saving equipment for unmanned air vehicles includes
  a container with an opening,
  a parachute, consisting of a parachute canopy, suspension lines and a harness, where the parachute can be folded inside the container,
  a stopper which divides the inner space of the container into the combustion chamber and the storage chamber for storing the parachute, where the storage chamber is arranged between the stopper and the container opening and where the stopper is designed to be slid out of the container through the opening, and
  a gas pyro actuator placed in the combustion chamber and connectable to the activation line.

9 Claims, 6 Drawing Sheets

(56) References Cited

U.S. PATENT DOCUMENTS

Figure 1:
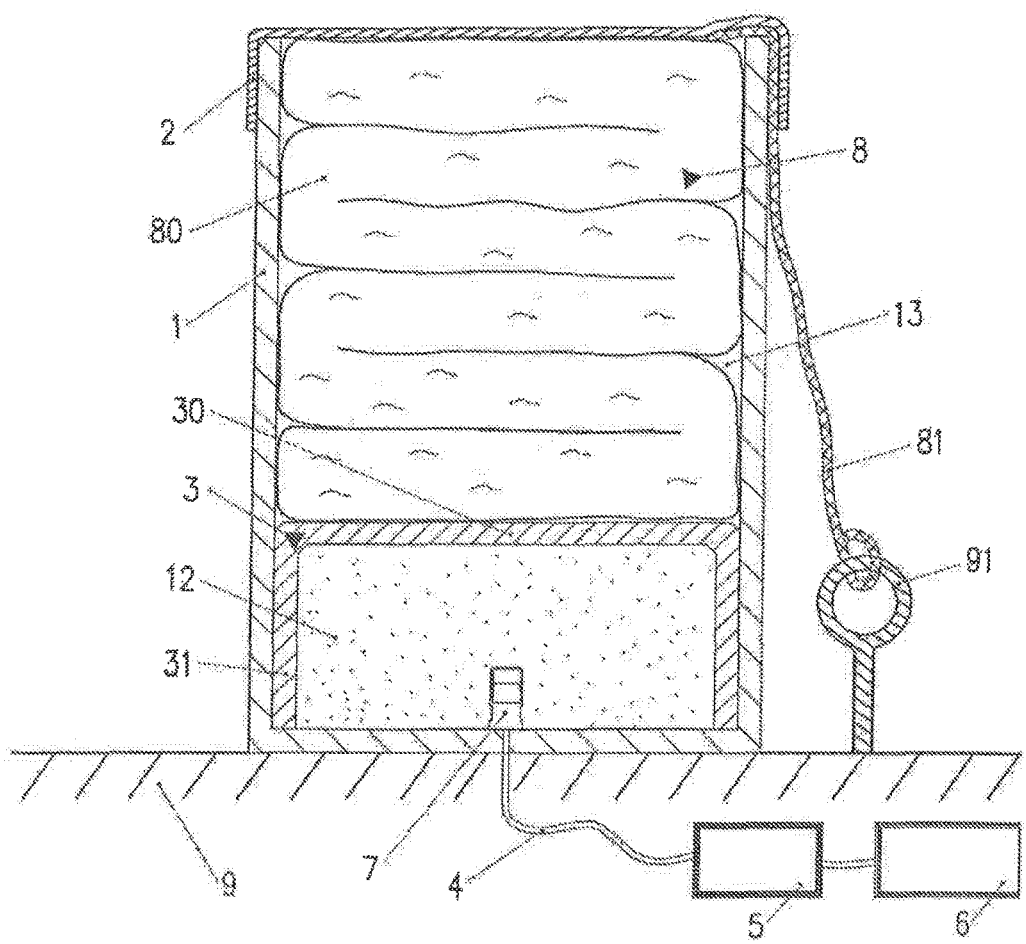

| | | | | |
|---|---|---|---|---|
| 3,442,474 A * | 5/1969 | Foster | ........... | B64D 17/725 |
| | | | | 102/334 |
| 3,926,391 A * | 12/1975 | Nordine | ........... | B64D 17/725 |
| | | | | 244/149 |
| 4,050,657 A * | 9/1977 | Murphy | ........... | B64D 17/80 |
| | | | | 244/139 |
| 4,565,341 A * | 1/1986 | Zacharin | ........... | B64D 17/80 |
| | | | | 102/386 |
| 4,709,884 A | 12/1987 | Gustafson | | |
| 5,836,544 A * | 11/1998 | Gentile | ........... | B64C 27/006 |
| | | | | 244/17.17 |
| 5,954,563 A | 9/1999 | Spriggs | | |
| 6,685,140 B2 * | 2/2004 | Carroll | ........... | B64C 39/024 |
| | | | | 244/139 |
| 7,918,419 B2 * | 4/2011 | Rosenfield | ........... | A63H 27/005 |
| | | | | 244/150 |
| 2015/0314881 A1 * | 11/2015 | Tsaliah | ........... | B64D 17/72 |
| | | | | 244/146 |

FOREIGN PATENT DOCUMENTS

| | | |
|---|---|---|
| RU | 2 018 466 C1 | 12/1990 |
| RU | 2 111 899 C1 | 4/1996 |

\* cited by examiner

LIFE-SAVING EQUIPMENT FOR UNMANNED AIR VEHICLES

TECHNOLOGY FIELD

The invention relates to a life-saving equipment for unmanned air vehicles which includes a container with an opening and a parachute placed in this container. The parachute consists of a parachute canopy, suspension lines and a harness.

The State of Existing Technology

As for existing technologies, there are life-saving devices of the above mentioned type. Their disadvantage is that they are relatively heavy and/or they can only be used with relatively light unmanned vehicles and/or the time they need to activate the parachute is relatively long.

The Invention Essentials

The previously mentioned disadvantages in the existing technologies are eliminated thanks to the new life-saving equipment for unmanned air vehicles which includes
- a container with an opening,
- a parachute consisting of a parachute canopy, suspension lines and a harness, folded in the container,
- a stopper which divides the inner space of the container into the combustion chamber and the parachute storage chamber, where the storage chamber is arranged between the stopper and the container opening and where the stopper is designed to be slid out of the container through the opening, and
- gas pyro actuator placed in the combustion chamber and connectable to the activation line.

Furthermore, the advantageous design of the life-saving unit includes a switch unit, an electricity accumulator connected to the switch unit and an activation line to connect the switch unit to the gas pyro actuator.

In this particularly advantageous design the stopper includes a piston part, the shape of which matches the shape of the container opening, and guide sideboards to lead the sliding movement of the stopper in the direction of the container opening axis. Advantageously, the guide sideboards fit tightly to the inner walls of the container in the combustion chamber area.

The alternative design of the life-saving equipment further includes the inner divider which divides the combustion chamber into a high-pressure chamber and a low-pressure chamber, with the gas pyro actuator placed in the high-pressure chamber. Therefore it is advantageous when the stopper and particularly its piston part fits tightly to both the high-pressure chamber and the low-pressure chamber while the guide sideboards fit, at least partially, to the inner divider.

In the particularly advantageous design, the switch unit is remote-controlled, by radio signal in particular.

The life-saving device with advantage also includes a removable lid for closing the container opening and/or a lug for fastening the parachute harness to an unmanned air vehicle and/or a weight attached to the parachute canopy.

THE OVERVIEW OF THE FIGURES INCLUDED IN THE TECHNICAL DRAWINGS

Figure 1A:
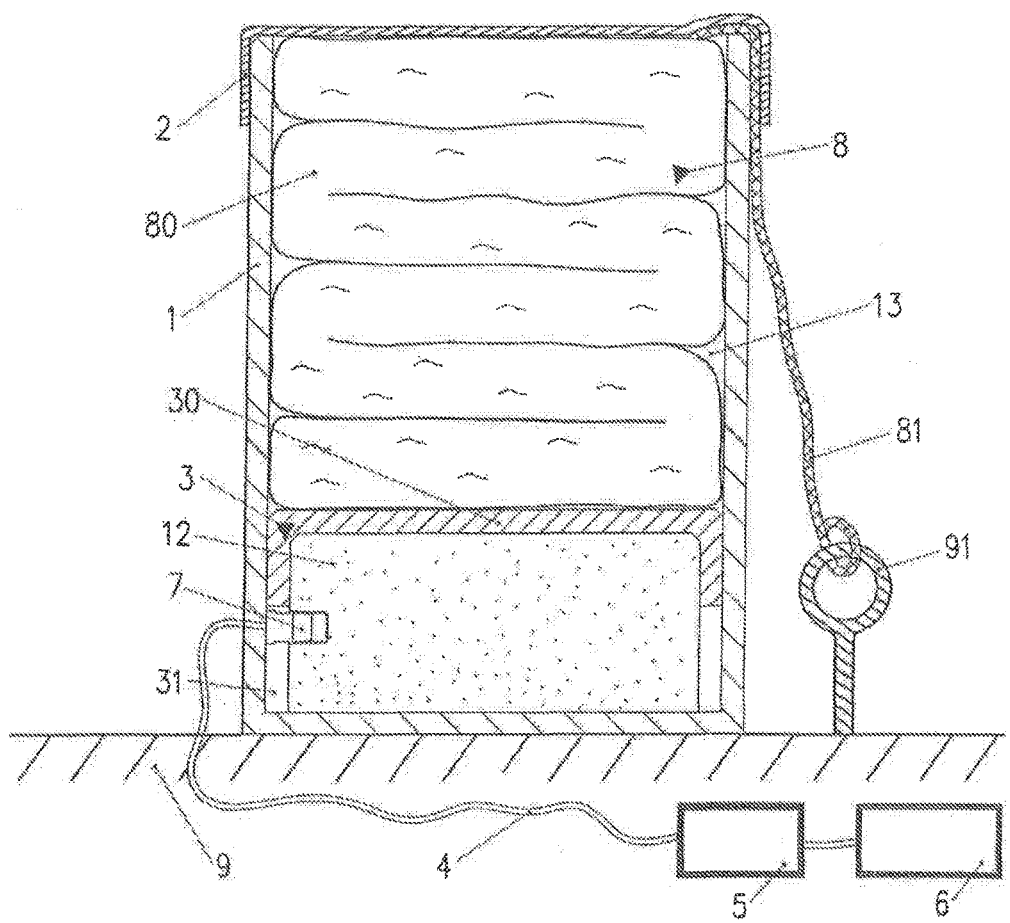
Figure 2:
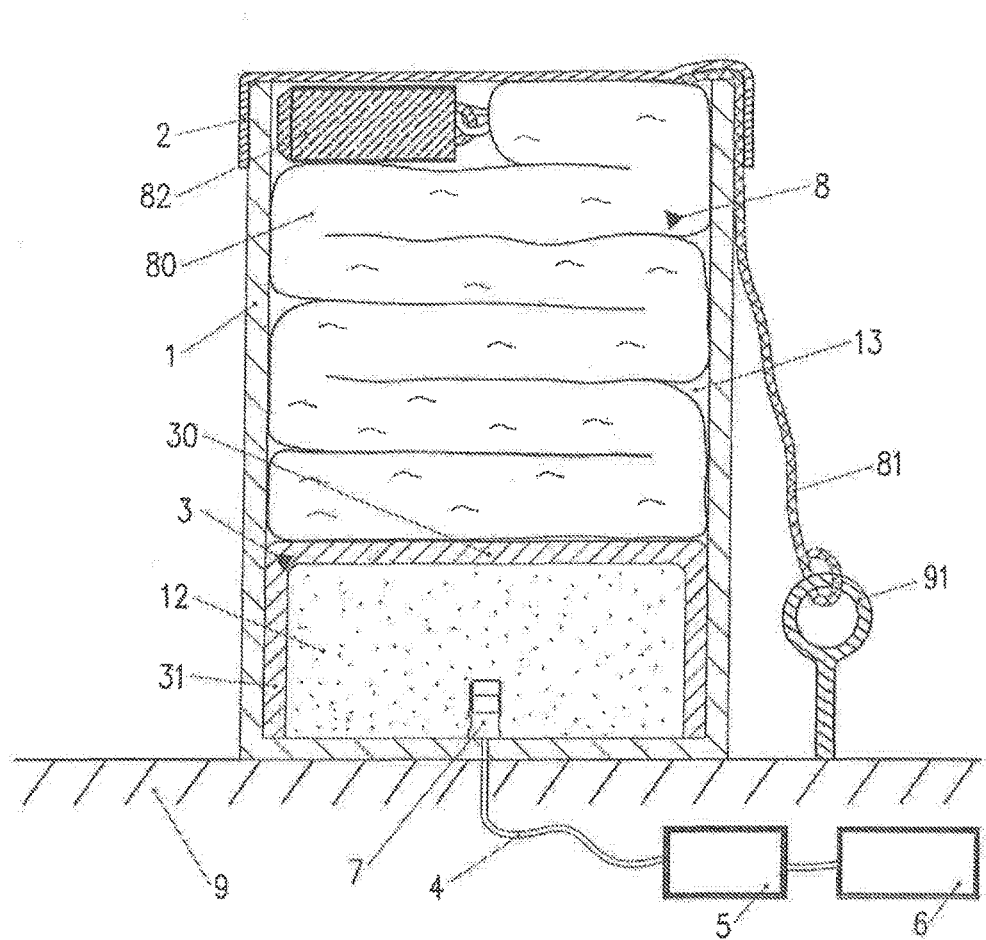
Figure 3:
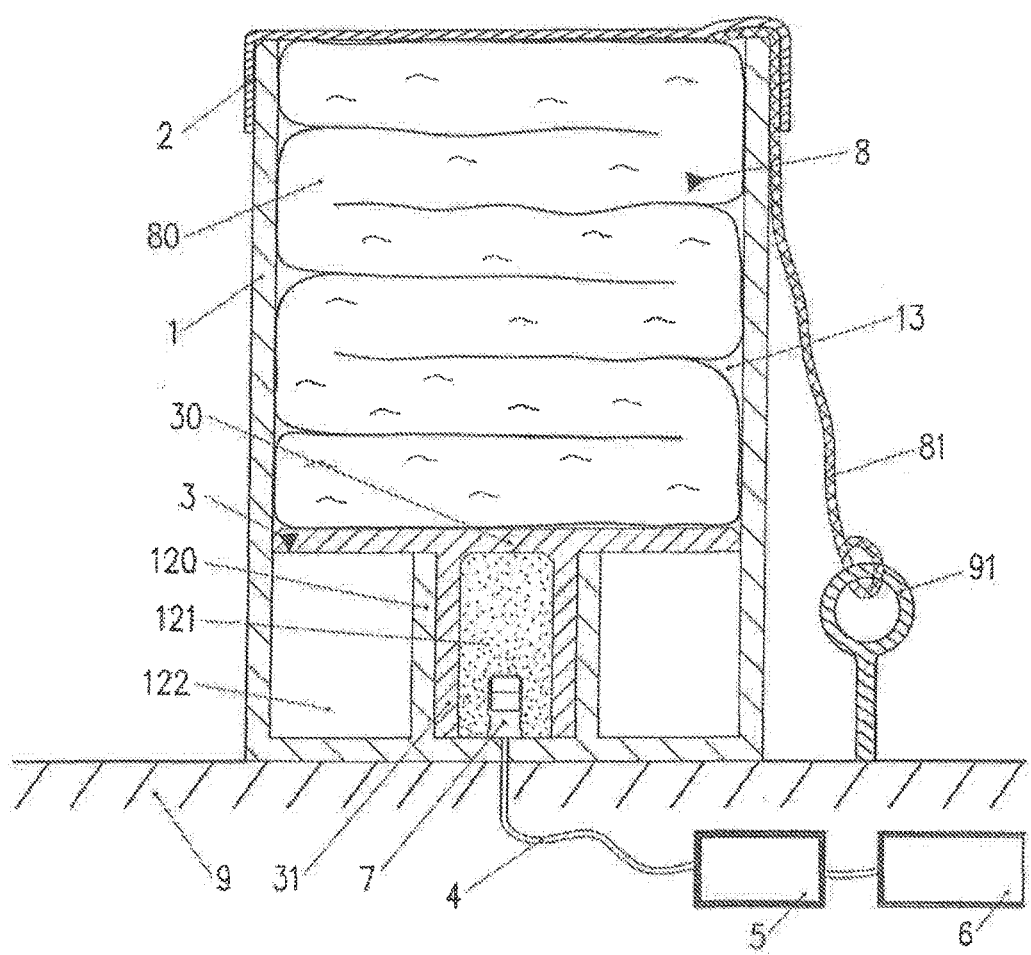
Figure 4:
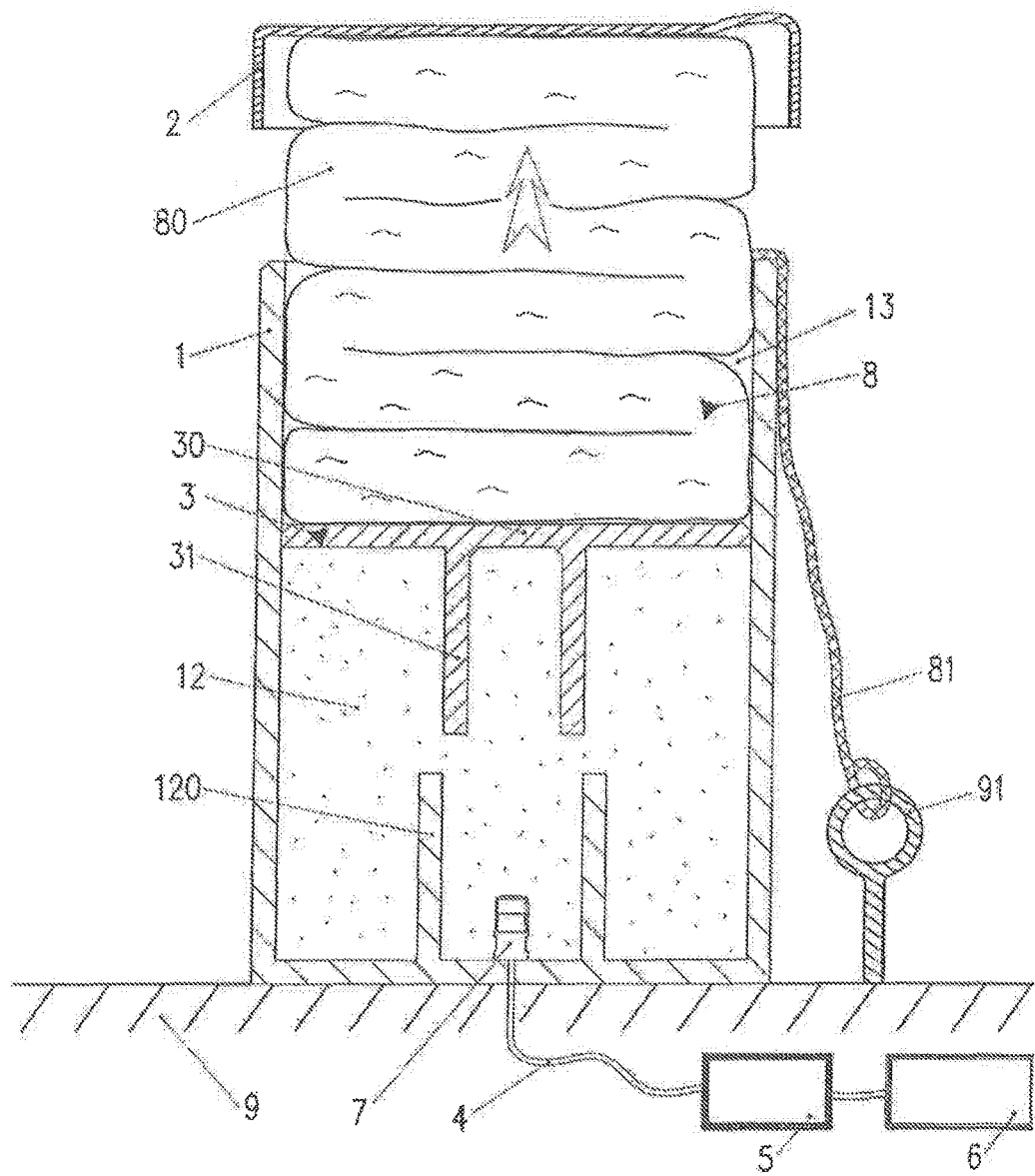
Figure 5:
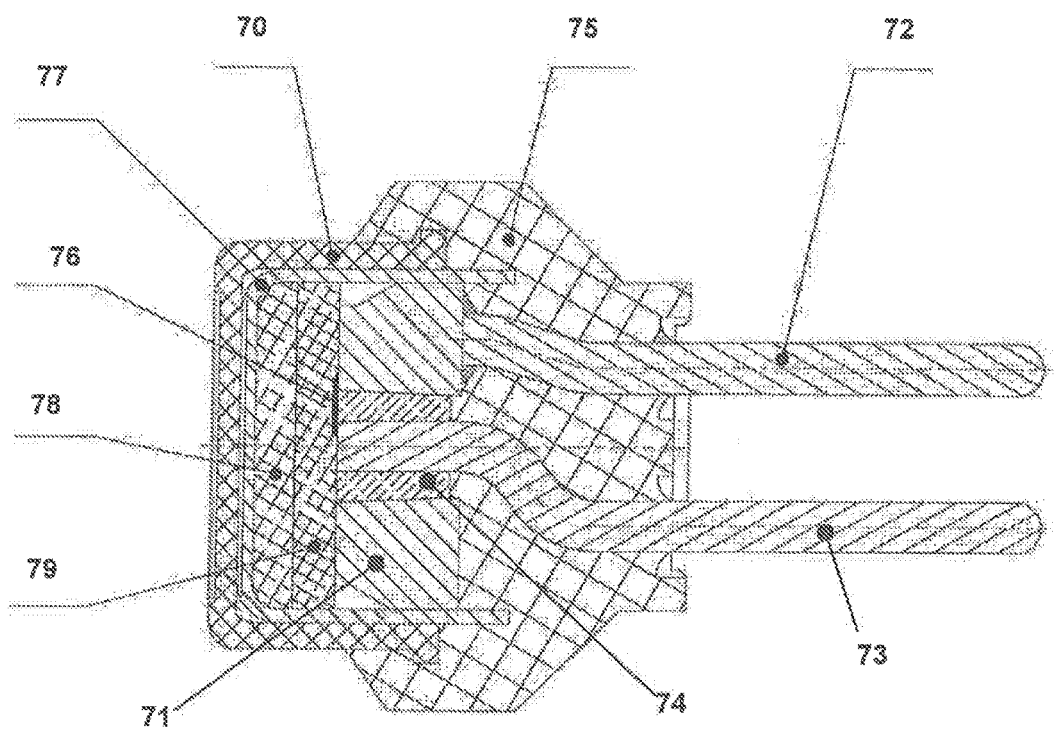

The model designs of the invention are schematically depicted in the drawings, where FIG. 1 shows the cross-section of the first model design, FIG. 1a shows the alternative to the first design, FIG. 2 shows the cross-section of the second model design, FIG. 3 shows the cross section of the third model design when assembled, FIG. 4 shows the cross section of the third model design shortly after activation and FIG. 5 shows the cross-section of the pyro actuator model design.

THE DESCRIPTION OF THE MODEL IMPLEMENTATION OF THE INVENTION

As it is clearly shown in FIG. 1, the life-saving equipment comprises of a container 1 with an opening which is sealed with a removable lid 2, e.g. made of fabric. The combustion chamber 12 and the storage chamber 13 are both arranged inside the container 1 and they are separated by an inserted stopper 3.

The stopper 3 includes a piston part 30 the shape of which matches the shape of the container 1 opening (with play or overlap) and also guide sideboards 31 which connect to the piston part 30 and fit tightly to the side walls of the container 1 in the combustion chamber 12 where the sideboards 31 and the piston part 30 plane form basically right angle. The transition between the piston part 30 and the sideboards 31 is advantageously rounded or its external edges are at least bevelled.

The container 1 can be for example cylindrical and its diameter can be 50 to 200 mm.

The container 1 can be advantageously made of a composite material or aluminium alloys and the stopper 3 can be made of a similar material.

The guide sideboards 31 can form a continuous, e.g. cylindrical wall or they can be interrupted, e.g. formed by a few separately arranged pillars with spaces between them.

The container 1 shown in FIG. 1 is fixed to the base 9.

The parachute 8 is folded on top of the stopper 3, in the storage chamber 13. It is folded so that its harness 81 connected to the suspension lines which are not shown in the figure is placed outside the container 1 and fixed to the lug 91 which is fixed to the base 9.

The parachute 8 consists of at least a parachute canopy 80, suspension lines and a harness 81.

The gas pyro actuator 7 is placed in the combustion chamber 12. It can be e.g. a Nippon Kayaku company or Indet Safety System pyrotechnic actuator.

Advantageously, it is the pyro actuator 7 schematically depicted in FIG. 5. This pyro actuator 7 includes a pair of conductive contact pins 72, 73 which are fixed to the carrier 71 with a space between them. The carrier 71 is made of a conductive material, e.g. stainless steel.

The grounding pin 72 can be soldered to the carrier 71, with advantage.

The current pin 73 is fitted in the carrier 71 and sealed with an insulating glass seal 74 and the current pin 73 is provided with circumferential grooves in the area of the glass seal 74. In the particularly advantageous design the opening for the embedding of the current pin 73 with the seal 74 in the carrier 71 is conical and becomes wider towards the primary pyrotechnic compound 79.

The contact ends of the pins 72, 73 protrude from the carrier 71 on one of its sides whereas on its other side there is the working end of the current pin 73 connected to the carrier 71 or more precisely through the carrier 71 to the grounding pin 72, using a resistance wire 76, e.g. a nickel-chrome resistance wire. The resistance wire 76 is placed in or adjacent to the primary pyrotechnic compound 79 which can be e.g. so called ZWPP compound, which is a pyrotechnic compound containing zirconium, wolfram and potassium perchlorate as the main components.

The secondary pyrotechnic compound 78 is adjacent to the primary pyrotechnic compound 79 and both are fixed to the carrier 1 using an interior cup 77. There is an insulation cup 70 placed on the interior cup 77, e.g. made of PA12 material. The construction is then reinforced by a plastic body 75, e.g. made of PA6.6 polyamide filled with glass fibre.

The total amount of the pyrotechnic compounds 78, 79 is 40 to 1000 mg with advantage. In the particular advantageous design the weight of the primary compound 79 is 40 to 60 mg and the weight of the secondary compound 78 is 110 to 150 mg, where both of them consist of ZWPP.

After the electric actuating pulse is brought to the pins 72, 73, the resistance wire 76 heats up. It then ignites the primary pyrotechnic compound 79. When both the pyrotechnic compounds 78, 79 have burnt down, required amount of gas is generated within 2 milliseconds.

The activation line 4 which connects the gas pyro actuator 7 to the switch unit 5 and the accumulator 6 (battery) leads through the base 9 and through the bottom of the container 1 into the combustion chamber 12. Alternatively, the activation line 4 does not have to lead through the base 9.

The switch unit 5 is arranged outside the container 1 and is controlled remotely or is connected to a remotely controlled device which is attached to the unmanned air vehicle. Another option is that the switch unit 5 is controlled by the unmanned air vehicle autopilot on the grounds of signals that are automatically assessed by the air vehicle control unit.

Alternatively, the switch unit 5 and/or the accumulator 6 can be placed in the container 1, e.g. at its bottom.

The remote control can use e.g. radio signal or digital signal.

The life-saving equipment depicted in FIG. 1 works as follows:

The life-saving equipment is installed on a unmanned air vehicle which is then used in the standard, known way.

If necessary, that implies especially in case there is a danger of the unmanned air vehicle crashing, the switch unit 5 is remotely activated. The switch unit 5 connects the accumulator and the activation line 4. The activation line 4 heats up the pyrotechnic compound in the gas pyro actuator 7 resulting in its ignition and the formation of a relatively big volume of gas. The pressure of the gas rapidly pushes the stopper 3 like a piston towards the lid 2 and thus the lid 2 is removed and the parachute 8, originally placed in the storage chamber 12 is shot out of the container 1. When the folded parachute 8 is shot out of the container 1, it forms an inertial mass which first tightens the canopy lines and then the canopy unfolds. At the same time the parachute 8 remains fixed to the base 9 through the harness and to the unmanned air vehicle and so the fall of the unmanned air vehicle is slowed down and a possible damage when hitting the ground is avoided.

The second design of the life-saving equipment is depicted in FIG. 2 and it only differs from the first design in one thing and that is a weight 82 which is attached to the top of the parachute 8 canopy 80. This weight 82 creates an additional inertial mass when the parachute 8 is shot out of the container 1 and it ensures the tightening of the suspension lines even at higher speeds. The weight 82 can be made of e.g. steel and can weigh 10 g to 500 g.

The third design of the life-saving equipment following this technical solution is depicted in FIGS. 3 and 4 and differs from the design depicted in FIG. 1 mainly in the division of the combustion chamber 12 into a high-pressure chamber 121 and a low-pressure chamber 122. The combustion chamber 12 is divided using the inner divider 120 which protrudes from the bottom of the container 1 and creates the inner, e.g. cylindrical, wall. The gas pyro actuator 7 is placed at the bottom of the container 1 in the high-pressure chamber 121. Both the low-pressure chamber 122 and the high-pressure chamber 121 are closed using a stopper 3 on the opposite side from the bottom of the container 1.

Again, the stopper 3 in this sample design has a piston part 30 the shape of which matches the shape of the container 1 opening and it is again provided with guide sideboards 31. Unlike the first and the second designs, the guide sideboards 31 do not fit tightly to the side walls of the container 1 but they fit tightly to the inner divider 120 on its inner side. They can possibly fit tightly to its outer side.

Thanks to this design, the maximum power affecting the unmanned air vehicle decreases when, or more precisely immediately after the pyrotechnic compound ignites (FIG. 3) because the area of the high-pressure chamber 121 bottom is small and therefore it does not create excessive power even at a higher pressure. After the stopper 3 is pushed out and thus the high-pressure chamber 121 and the low-pressure chamber 122 connect (FIG. 4), the area of the bottom dramatically increases but the gas pressure dramatically decreases before that thanks to the change in volume. In other words the recoil power divides into two steps.

The above described and depicted containers 1 were cylindrical with a circular plan and these containers 1 contained stoppers 3 with a circular plan as well. But it is also possible to create a prismatic container and adjust the plan of the stopper 3 to the plan of the container 1 and particularly to the shape of the container 1 opening.

Also the gas pyro actuator 7 does not always have to be arranged at the bottom of the container 1. In the alternative design the gas pyro actuator 7 can be fixed to the side wall of the container 1. The guide sideboards 31 have to be adjusted to this alternative design, e.g. they can be provided with a cut-out in the appropriate place. Also the activation line 4 is alternatively led through the side wall of the container 1 (as depicted in FIG. 1a).

The switch unit 5 and the accumulator 6 can be prepared to be used for the activation of the life-saving equipment exclusively or they can be a part of the unmanned air vehicle operating unit.

The life-saving equipment following this technical solution is advantageous especially when used with unmanned air vehicles with a takeoff mass of 1 to 100 kg.

If necessary there can be more than one gas pyro actuator 7 arranged in the combustion chamber 12.

Although a lot of sample designs have been described, it is obvious that an expert in this particular field can easily find further possible alternatives to these designs. Therefore the extent of this invention is not limited to those sample designs but it is rather defined by the patent claims enclosed.

The invention claimed is:

1. A life-saving equipment for unmanned air vehicles which comprises
   a container with an opening,
   a parachute, consisting of a parachute canopy, suspension lines and a harness, where the parachute can be folded inside the container, a stopper which divides the inner space of the container into a combustion chamber and a storage chamber for storing the parachute, where the storage chamber is arranged between the stopper and the container opening and where the stopper is designed to be slid out of the container through the opening, a piston part of the stopper fitting tightly to both the combustion chamber and the storage chamber, and at least one gas pyro actuator placed in the combustion chamber and connectable to an activation line.

2. The life-saving equipment according to claim 1 wherein the equipment further containing a switch unit, an electricity accumulator which is connected to the switch unit and the activation line to connect the switch unit to the gas pyro actuator.

3. The life-saving equipment according to claim 1 wherein the stopper containing guide sideboards to lead the sliding movement of the stopper in the direction of the container opening axis.

4. The life-saving equipment according to claim 3 wherein the guide sideboards of the stopper fitting tightly to the inner walls of the container in the combustion chamber area.

5. The life-saving equipment according to claim 2 wherein the switch unit being remotely controlled by a radio signal.

6. The life-saving equipment according to claim 3 wherein the equipment further containing an inner divider which divides the combustion chamber into a high-pressure chamber and a low-pressure chamber, with the gas pyro actuator placed in the high-pressure chamber, and sideboards fit, at least partially, to the inner divider.

7. The life-saving equipment according to claim 1 wherein further containing a removable lid for closing the container opening.

8. The life-saving equipment according to claim 1 wherein further containing a lug for fastening the parachute harness to an unmanned air vehicle.

9. The life-saving equipment according to claim 1 wherein further containing a weight attached to the parachute canopy.

* * * * *